United States Patent [19]

Neat

[11] 4,201,606

[45] May 6, 1980

[54] REFRACTORY EXOTHERMIC HEATING INSULATING ARTICLES

[75] Inventor: Frank Neat, Elora, Canada

[73] Assignee: Foseco Trading AG., Chur, Switzerland

[21] Appl. No.: 924,564

[22] Filed: Jul. 14, 1978

[30] Foreign Application Priority Data

Jul. 19, 1977 [GB] United Kingdom ............... 30271/77

[51] Int. Cl.$^2$ ............................................ C22C 38/40
[52] U.S. Cl. ................................... 149/37; 106/38.35; 106/65; 149/2; 252/62
[58] Field of Search ................... 106/38.35, 65; 149/2, 149/37; 252/62

[56] References Cited

U.S. PATENT DOCUMENTS

| 3,558,891 | 1/1971 | Yendrek et al. | 106/38.35 |
| 3,672,918 | 7/1972 | Rocher et al. | 149/2 X |
| 3,876,420 | 4/1975 | Phoenix et al. | 106/38.22 X |
| 4,008,109 | 2/1977 | Norton | 149/37 |

FOREIGN PATENT DOCUMENTS

| 921976 | 3/1963 | United Kingdom . |
| 1089879 | 11/1967 | United Kingdom . |
| 1283692 | 8/1972 | United Kingdom . |
| 1437062 | 5/1976 | United Kingdom . |

*Primary Examiner*—Leland A. Sebastian
*Attorney, Agent, or Firm*—Cushman, Darby & Cushman

[57] ABSTRACT

Refractory articles are described which are of use e.g. as hot top lining slabs or riser sleeves in the metallurgical industry. The slabs are both heat insulating and they have exothermic properties when contacted by molten metal. The articles comprise by weight 8 to 20% of a particulate oxidizable metal, 5 to 25% of fibrous refractory material and 5 to 20% of an expanded perlite having a bulk density (untamped) of less than 0.15 g/cc. The overall density of the article is less than 0.75 g/cc.

13 Claims, No Drawings

REFRACTORY EXOTHERMIC HEATING INSULATING ARTICLES

This invention relates to refractory exothermic heat insulating articles of use in the metallurgical industry.

In the metallurgical industry, use is made of a wide variety of refractory heat insulating articles in order to reduce heat loss from molten metal. Examples of such applications are the provision of hot top linings in the upper ends of ingot moulds, riser sleeves in metal casting moulds and boards for placing on exposed molten metal surfaces to reduce the loss of heat therefrom and accordingly reduce the incidence of pipe in the solidified metal. The latter are referred to simply as anti-piping compositions in board form.

Many such articles have been manufactured and there is a substantial patent and other literature on their formulation and manufacture. While the desired effect may be obtained simply by the heat insulating properties of such refractory heat insulating articles, it is known to incorporate in the articles a greater or smaller proportion of an exothermically reacting mixture which fires when contacted by an external source of heat such as molten metal and which serves either simply to heat the refractory heat insulating article up, so minimising the chilling effect of the article on the molten metal, or which, because of a substantial exothermic reaction, positively supplies heat to the molten metal.

Refractory exothermic heat insulating articles of this type, in order to be satisfactory in use, must not only perform properly thermally but must have the requisite mechanical properties to enable them to be handled easily and withstand the mechanical forces to which they are subjected in use. Finally, it is desirable, when making an article which will fulfil the thermal and mechanical desiderata, to make it in a simple and inexpensive fashion from easily available relatively inexpensive ingredients.

We have now found that highly satisfactory refractory exothermic heat insulating articles of use in the metallurgical industry which have a degree of exothermicity and which burn out to give a burnt out article of highly satisfactory strength and heat insulating ability, may be made by a slurry technique using a certain specific combination of ingredients.

According to the present invention there is provided a refractory exothermic heat-insulating article of use in the metallurgical industry which has a density of less than 0.75 g/cc, has both exothermic and heat insulating properties and which is formed by removing liquid from a slurry, the solids content of the slurry including a binder and including by weight of the total solids 8 to 20% of a particulate oxidisable metal, 5 to 25% of a fibrous refractory material and 5 to 20% of an expanded perlite having in its dry powder state a bulk density (untamped) of less than 0.15 g/cc.

It is surprisingly found that although the articles of the present invention include 5 to 20% by weight of an expanded perlite as noted above, the articles can be used in direct contact with molten steel without collapsing and without substantial penetration by the molten steel despite the softening point of perlite being very much lower than the temperature of the steel.

Naturally, if too much perlite were present in the article, the well known disadvantages of high quantities of this material in refractory products would occur. Thus the strength of the product would be reduced, the compression under the metallostatic pressure from molten metal would be increased, and there would be an increased tendency for metal penetration to occur and for the article to form a liquid slag. By restricting the proportion and type of perlite within the ranges defined above, the desirable low density high heat insulating properties of the refractory article may be realised without incurring these disadvantages.

The incorporation of the perlite naturally assists the formation of an article of density less than 0.75 g/cc. Preferably the ingredients and their proportions are selected to give a density of less than 0.6 g/cc, most preferably 0.35 to 0.45 g/cc.

The exothermic properties of articles according to the invention are provided by the inclusion of oxidisable metal in their composition. When the article is first contacted by molten metal, the oxidisable metal oxidises giving off heat as it does so. The composition preferably contains at least 10% by weight of the oxidisable metal in order to give a sufficient exothermic effect and in addition, the exothermic effect may be enhanced by including in the composition of the articles an oxidising agent for the metal. The oxidising agent should be included in particulate form and is preferably iron oxide and/or manganese dioxide. The oxidisable metal is preferably aluminium but may be magnesium. Naturally the amount of any oxidising agent included should be chosen having regard to the increase in exothermic effect desired over that which would be generated by the inclusion of the particulate metal only.

The exothermic properties of the article may be further improved by including within the composition a sensitiser for the reaction between the oxidisable metal and the oxidising agent. Preferred sensitisers are inorganic fluorides and they may constitute 2 to 5% by weight of the composition of the article in which they are included.

In addition to providing the desired exothermic effect, the oxidisable metal and any oxidising agent added promote the formation in use of a burnt out refractory article which still has high thermal insulation properties. Accordingly the articles of the present invention have a highly satisfactory ability to reduce heat loss from molten metals over a long period of time.

Preferably the particulate oxidisable metal constitutes 12 to 17% by weight of the article and an oxidising agent therefor 3 to 6% by weight.

The fibrous refractory material imparts a desirable level of mechanical strength to the articles and in particular avoids brittleness. In addition, the incorporation of a fibrous material in the composition aids in the production of a low density product and additionally imparts a degree of hot strength to the product. The preferred fibrous refractory material is aluminosilicate fibre.

In addition to the refractory fibre, the article may contain a minor proportion of fusible inorganic fibre such as glass fibre, e.g. 1 to 2% by weight, and/or a proportion of organic fibrous material, e.g. up to 8%. For example the article may contain 2 to 8% by weight of scrap newsprint.

Preferred articles according to the invention contain 10 to 20% by weight of fibrous refractory material.

In addition to the various ingredients noted above, the articles preferably include a powdery or granular refractory filler such as alumina, titania, zirconia or magnesia which is preferably present in an amount of 20 to 50% by weight. The articles are preferably substantially free of free silica. The inclusion of a proportion of refractory filler of this type increases the overall refractoriness of the article.

The binder used is preferably an organic binder such as a starch or resin binder, e.g. phenol formaldehyde resin, ureaformaldehyde resin. The binder preferably constitutes 8 to 18% by weight of the article. Inorganic binders may also be used, for example the residue of a colloidal oxide hydrosol such as colloidal silica sol. The article may be bound by one or more binders.

As noted above, the articles of the present invention are manufactured from a slurry of the ingredients, conventionally aqueous. Slurry manufacturing techniques for refractory articles for use in the metallurgical industry are well known and have the advantage of enabling the production of articles without any significant loss of raw materials. In addition to the various ingredients noted above, surface active agents and/or suspension agents may be incorporated in the slurry to assist the manufacturing process which fundamentally consists of dewatering a quantity of the slurry in a former of the desired shape. The damp shape of dewatered solids is then removed from the former and dried, and the binder caused or allowed to set. The density of the article produced may be varied in known fashion by modifying the process conditions.

As noted above, the expanded perlite used must be one having a bulk density (untamped) of less than 0.15 g/cm$^3$. We have found that it is highly preferable if in addition to using an expanded perlite of this type, at least 90% by weight of the expanded perlite consists of particles of particle size 0.053 to 0.71 mm. Preferably all or substantially all of the perlite is of particles within this size range.

Preferred and most preferred particle size distributions for the perlite used are set out in the following table:

| Particle size (mm) | Preferred maximum weight % | Most preferred maximum weight % |
|---|---|---|
| .355 to .5 | 12 | 7 |
| .25 to .355 | 15 | 12 |
| .15 to .25 | 25 | 18 |
| .105 to .15 | 20 | 14 |
| .075 to .105 | 30 | 21 |
| .053 to .075 | 30 | 15 |
| less than .053 | 20 | 14 |

It is found that the use of an expanded perlite with a preferred or most preferred particle size distribution as just set out means that very little of the perlite is lost during manufacture as a result of its floating on the slurry water.

In addition to the various ingredients noted above, the composition may include other materials such as light weight fillers other than perlite e.g. kieselguhr and other inorganic fibres such as slag wool. Additives to improve the handling properties of the slurry, e.g. suspension agents, may also be included.

The following Examples in which all parts and percentages are by weight will serve to illustrate the invention:

EXAMPLE 1

An aqueous slurry was made up comprising the following solids ingredients:

| | Parts by weight |
|---|---|
| paper | 4 |
| phenol formaldehyde resin | 5 |
| urea formaldehyde resin | 7 |
| starch | 3 |
| aluminosilicate fibre | 16 |
| fibreglass | 1 |
| iron oxide | 4 |
| aluminium powder | 14 |
| cryolite | 3 |
| alumina | 30 |
| expanded perlite | 12 |
| flocculant and defoamer solutions | 1 |
| | 100 |

Portions of the slurry, which was of solids content 20%, were dewatered in a slab mould, stripped and dried in an oven to give refractory tiles which had a density of 0.36 g/cc.

EXAMPLE 2

Exothermic tiles of density 0.41 gm/cm$^3$ were made as in Example 1 but from an aqueous slurry of the following ingredients:

| | Parts by weight |
|---|---|
| paper | 6 |
| phenol formaldehyde resin | 7 |
| urea formaldehyde resin | 6 |
| fibreglass | 2 |
| iron oxide | 5 |
| aluminium powder | 10 |
| expanded perlite | 11 |
| cryolite | 2 |
| aluminosilicate fibre | 10 |
| alumina | 41 |

EXAMPLE 3

Exothermic tiles of density 0.34 gm/cm$^2$ were made as in Example 1 but from an aqueous slurry of the following ingredients:

| | Parts by weight |
|---|---|
| paper | 7 |
| phenol formaldehyde resin | 4 |
| urea formaldehyde resin | 3 |
| starch | 4 |
| aluminosilicate fibre | 10 |
| iron oxide | 5 |
| aluminium powder | 16 |
| expanded perlite | 16 |
| potassium cryolite | 3 |
| alumina | 32 |

EXAMPLE 4

Exothermic tiles were made by vacuum dewatering in a former various aqueous slurries comprising the following ingredients in the following parts by weight:
urea formaldehyde resin: 7.5 parts
phenol formaldehyde resin: 8 parts
paper: 5.8 parts
manganese dioxide: 4 parts
inorganic fluoride: 3 parts
surfactant and suspension agent: 0.2 parts
together with amounts of alumino silicate, fibre, perlite, aluminum and calcined alumina as set out in the following table:

TABLE

| COMPOSITION NO. | PARTS BY WEIGHT | | | |
|---|---|---|---|---|
| | ALUMINO-SILICATE FIBRE | PERLITE | ALUMINIUM | CALCINED ALUMINA |
| 1 | 15 | 10 | 18 | 28.5 |
| 2 | 0 | 10 | 18 | 43.5 |
| 3 | 15 | 10 | 5 | 41.5 |
| 4 | 15 | 10 | 0 | 46.5 |
| 5 | 15 | 25 | 18 | 13.5 |
| 6 | 15 | 0 | 18 | 38.5 |
| 7 | 20 | 15 | 20 | 16.5 |
| 8 | 42 | 0 | 12 | 17.5 |

Slabs of standard size 2.5×25×25 cm were made up, their density was measured and the slabs were then used to line the head of a casting mould to form a heat insulating hot top. Steel was then cast into the mould at 1600° C. and allowed to solidify therein. Visual examination of the performance of the hot top slabs was carried out and the results are tabulated in the following table: Also, the thermal properties of the slabs were tested using a standard AMITEC (Registered Trade Mark) test rig. These results are likewise tabulated in the following table. The strength of the slabs was subjectively assessed by their liability to damage or breakage during handling. Compression under the effect of metallostatic pressure was visually assessed after the casting had solidified.

All of the compositions showed negligible slagging in the test, save No. 5 and 7. Molten metal penetration into the slab was negligible in the case of compositions 1, 2 and 6 to 8, slight for compositions 3 and 4 and moderate in the case of composition 5.

TABLE

| Composition No. | Density gm/cm$^3$ | Thermal Properties | | | |
|---|---|---|---|---|---|
| | | Exothermicity | Final Insulation Value | Strength | Compression |
| 1 | 0.38 | good | high | good | negligible |
| 2 | 0.48 | good | high | brittle | negligible |
| 3 | 0.38 | poor | low | good | slight |
| 4 | 0.38 | nil | low | weak | moderate |
| 5 | 0.26 | poor | low | weak | severe |
| 6 | 0.55 | poor | low | good | negligible |
| 7 | 0.32 | good | high | good | slight |
| 8 | 0.44 | good | high | weak | negligible |

It is evident from these results that only compositions 1 and 7 are satisfactory in all respects. Omission of the aluminosilicate fibre (composition 2) adversely affects both strength and density, while its use in excess (Composition 8) leads to low strength slabs. Omission of aluminum (Compositons 3 and 4) renders the slabs inadequately exothermic.

If too much perlite is included (composition 5), strength, exothermicity and the final insulation value are all decreased.

I claim:

1. A refractory exothermic heat insulating article of use in the metallurgical industry which has a density of less than 0.75 g/cc, has both exothermic and heat insulating properties and which is formed by removing liquid from a slurry, the solids content of the slurry including a binder and including by weight of the total solids 8 to 20% of a particulate oxidisable metal, 5 to 25% of a fibrous refractory material, 5 to 20% of an expanded perlite having in its dry powder state a bulk density (untamped) of less than 0.15 g/cc and a proportion of an oxidising agent for the oxidisable metal in particulate form.

2. The article of claim 1, wherein at least 90% by weight of the perlite is of particle size 0.053 to 0.71 mm.

3. The article of claim 1, wherein the fibrous refractory material consists essentially of aluminosilicate fibres.

4. The article of claim 1 and including particulate alumina.

5. The article of claim 1, wherein the density is less than 0.6 g/cc.

6. The article of claim 5, wherein the density is 0.35 to 0.45 g/cc.

7. A method of making the article of claim 1, which comprises forming the ingredients of the article into an aqueous slurry, dewatering a quantity of the slurry in a former to give a damp article of the desired shape, removing the damp article from the former, drying the article and causing or allowing the binder to set.

8. A refractory exothermic heat insulating article of use in the metallurgical industry which has a density of less than 0.75 g/cc, has both exothermic and heat insulating properties and which is formed by removing liquid from a slurry, the solids content of the slurry including a binder and including by weight of the total solids 8 to 20% of a particulate oxidisable metal, 5 to 25% of a fibrous refractory material and 5 to 20% of an expanded perlite having in its dry powder state a bulk density (untamped) of less than 0.15 g/cc.

9. The article of claim 8, wherein at least 90% by weight of the perlite is of particle size 0.053 to 0.71 mm.

10. The article of claim 8, wherein the fibrous refractory material consists essentially of aluminosilicate fibres.

11. The article of claim 8 and including particulate alumina.

12. The article of claim 8, wherein the density is less than 0.6 g/cc.

13. The article of claim 8, wherein the density of 0.35 to 0.45 g/cc.

* * * * *